United States Patent
Wang et al.

(10) Patent No.: US 10,483,580 B2
(45) Date of Patent: Nov. 19, 2019

(54) SOLID STATE FUEL CELL AND METHOD FOR MAKING THE SAME

(71) Applicant: National Taipei University of Technology, Taipei (TW)

(72) Inventors: Sea-Fue Wang, Taipei (TW); Yi-Xin Liu, Taipei (TW); Ting-Ting Yang, Taipei (TW)

(73) Assignee: National Taipei University of Technology, Taipei (TW)

( * ) Notice: Subject to any disclaimer, the term of this patent is extended or adjusted under 35 U.S.C. 154(b) by 342 days.

(21) Appl. No.: 15/366,834

(22) Filed: Dec. 1, 2016

(65) Prior Publication Data

US 2018/0123157 A1 May 3, 2018

(30) Foreign Application Priority Data

Nov. 2, 2016 (TW) .............................. 105135423 A

(51) Int. Cl.
| | |
|---|---|
| *H01M 8/1246* | (2016.01) |
| *C04B 35/16* | (2006.01) |
| *C04B 35/626* | (2006.01) |
| *H01M 8/124* | (2016.01) |

(52) U.S. Cl.
CPC ........... *H01M 8/1246* (2013.01); *C04B 35/16* (2013.01); *C04B 35/6262* (2013.01); *C04B 35/6264* (2013.01); *H01M 2008/1293* (2013.01)

(58) Field of Classification Search
None
See application file for complete search history.

(56) References Cited

U.S. PATENT DOCUMENTS

2012/0107714 A1* 5/2012 Day .................... H01M 8/0273
429/457

OTHER PUBLICATIONS

Li et al., "Hydrothermal Synthesis, Structure Investigation, and Oxide Ion Conductivity of Mixed Si/Ge-Based Apatite-Type Phases", Inorg. Chem 2014, 53, 4803-4812 (Year: 2014).*
Xiao Guo Cao & San Ping Jiang, "Effect of Sr and Al or Fe co-doping on the sinterability and conductivity of lanthanum silicate oxyapatite electrolytes for solid oxide fuel cells," International Journal of Hydrogen Energy 39 (2014) 19093-19101.
Adrien Vincent, et al., "Elaboration and ionic conduction of apatite-type lanthanum silicates doped with Ba, La10-xBax (SiO4)6O3-x/2 with x=0.25-2.," Journal of the European Ceramic Society 27 (2007) 1187-1192.
Xifeng Ding, et al., "Enhanced ionic conductivity of apatite-type lanthanum silicate electrolyte for IT-SOFCs through copper doping," Journal of Power Sources 306 (2016) 603-635.
D.D.Y. Setsoafia, et al., "Sol-gel synthesis and characterization of Zn2+ and Mg2+ doped La10Si6O27 electrolytes for solid oxide fuel cells," Solid State Sciences 48 (2015) 163-170.
Jun Xiang, et al., "Synthesis and electrical conductivity of La10Si5.5B0.5O27+ δ (B=in, Si, Sn, Nb) ceramics," Solid State Ionics 220 (2012) 7-11.

* cited by examiner

*Primary Examiner* — Carmen V Lyles-Irving
(74) *Attorney, Agent, or Firm* — DLA Piper LLP (US)

(57) ABSTRACT

A solid state fuel cell includes an anode, a cathode, and a ceramic electrolyte. The ceramic electrolyte includes a silicate oxyapatite represented by $RE_{y-x}M_xSiO_6O_{27\pm\delta}$, where RE is a rare earth metal, M is an alkali metal, x is greater than 0 and less than 2, y ranges from 9.3 to 10, and δ ranges from 0 to 2. A method for making the solid state fuel cell is also disclosed.

5 Claims, No Drawings

US 10,483,580 B2

SOLID STATE FUEL CELL AND METHOD FOR MAKING THE SAME

CROSS-REFERENCE TO RELATED APPLICATION

This application claims priority from Taiwanese patent application no. 105135423, filed on Nov. 2, 2016.

FIELD

The disclosure relates to a solid state fuel cell, more particularly to a solid state fuel cell including a ceramic electrolyte having a silicate oxyapatite doped with alkali metal cations, and a method for making the solid state fuel cell.

BACKGROUND

Conventionally, yttria-stabilized zirconia is widely used as a ceramic electrolyte of a solid state fuel cell. However, the conventional solid state fuel cell is operated at a very high temperature about 1000° C. to ensure yttria-stabilized zirconia to exhibit high ionic conductivity. To reduce the operating temperature of a solid state fuel cell, many approaches are being investigated, for example, (1) Adrien Vincent et al., "Elaboration and ionic conduction of apatite-type lanthanum silicates doped with Ba, $La_{10-x}Ba_x(SiO_4)_6O_{3-x/2}$ with x=0.25-2," Journal of the European Ceramic Society 27 (2007) 1187-1192, (2) A. Inoubli et al., "Influence of anionic vacancies on the conductivity of $La_{9.33}Si_{6-x}Al_xO_{26-x/2}$ oxide conductors with an oxyapatite structure," Journal of Power Sources 271 (2014) 203-212, and (3) Jun Xiang et al., "Synthesis and electrical conductivity of $La_{10}Si_{5.5}B_{0.5}O_{27+\delta}$ (B=In, Si, Sn, Nb) ceramics," Solid State Ionics 220 (2012) 7-11.

There is no prior art or literature which discloses a solid state fuel cell including a ceramic electrolyte having a silicate oxyapatite doped with alkali metal cations.

SUMMARY

An object of the disclosure is to provide a novel solid state fuel cell and a method for making the same. The solid state fuel cell includes a ceramic electrolyte having a silicate oxyapatite doped with alkali metal cations. The inventors of this application found that the silicate oxyapatite may have an enhanced ionic conductivity at a relatively low temperature by doping with the alkali metal cations. Therefore, the novel solid state fuel cell including such ceramic electrolyte may be operable at a relatively low temperature.

According to a first aspect of the disclosure, a solid state fuel cell comprising an anode, a cathode, and a ceramic electrolyte including a silicate oxyapatite represented by $$RE_{y-x}M_xSi_6O_{27\pm\delta}$$

where RE is a rare earth metal, M is an alkali metal, x is greater than 0 and less than 2, y ranges from 9.3 to 10, and δ ranges from 0 to 2.

According to a second aspect of the disclosure, a method for making a solid state fuel cell includes the steps of:
(a) processing a first mixture of rare earth oxide, silicon oxide, and an alkali metal dopant to obtain a silicate oxyapatite represented by $$RE_{y-x}M_xSi_6O_{27\pm\delta}$$

where RE is a rare earth metal, M is an alkali metal, x is greater than 0 and less than 2, y ranges from 9.3 to 10, and δ ranges from 0 to 2;
(b) grinding the silicate oxyapatite into powder;
(c) mixing the powder and a polymer binder to obtain a second mixture;
(d) processing the second mixture to obtain a green compact;
(e) sintering the green compact to obtain a ceramic electrolyte; and
(f) assembling the ceramic electrolyte with an anode and a cathode.

DETAILED DESCRIPTION

A solid state fuel cell according to an embodiment of the disclosure includes an anode, a cathode, and a ceramic electrolyte. The ceramic electrolyte includes a silicate oxyapatite represented by $$RE_{y-x}M_xSi_6O_{27\pm\delta}$$

where RE is a rare earth metal, M is an alkali metal, x is greater than 0 and less than 2, y ranges from 9.3 to 10, and δ ranges from 0 to 2.

Preferably, X is greater than 0 and less than 1.

Preferably, RE is lanthanum, M is sodium or potassium, and Y is 10.

More preferably, when M is sodium, X is not less than 0.5 and less than 1.0, and when M is potassium, X is not less than 0.2 and less than 1.0.

The ceramic electrolyte may be made by virtue of a solid-state reaction, a sol-gel process, a hydrothermal method, or a co-precipitation method. In this embodiment, the ceramic electrode is made using a solid-state reaction.

In this embodiment, a method for making a solid state fuel cell includes steps (a) to (f).

In step (a), a first mixture of rare earth oxide, silicon oxide, and an alkali metal dopant is processed to obtain a silicate oxyapatite represented by $$RE_{y-x}M_xSi_6O_{27\pm\delta}$$

where RE, M, x, y, and δ are as defined above.

In this embodiment, the first mixture is subjected to calcining to obtain the silicate oxyapatite.

Preferably, the rare earth oxide is lanthanum oxide ($La_2O_3$).

Preferably, the alkali metal dopant is selected from the group consisting of a sodium-containing compound, a potassium-containing compound, and a combination thereof.

More preferably, the alkali metal dopant is selected from the group consisting of sodium carbonate, sodium nitrate, sodium hydroxide, sodium ethoxide, sodium hydrogen carbonate, sodium peroxide, potassium carbonate, potassium nitrate, potassium hydroxide, potassium nitrite, potassium chloride, and combinations thereof. Most preferably, the alkali metal dopant is alkali metal carbonate, such as sodium carbonate, potassium carbonate, etc.

In step (b), the silicate oxyapatite is ground into powder.

In step (c), the powder and a polymer binder are mixed to obtain a second mixture. Preferably, the polymer binder is selected from the group consisting of polyvinyl alcohol (PVA), paraffin wax, polyethylene (PE), polypropylene (PP), polystyrene (PS), poly(methyl methacrylate) (PMMA), ethylene-vinyl acetate (EVA) copolymer, ethylene-ethyl acrylate (EEA) copolymer, and combinations thereof.

In step (d), the second mixture is processed to obtain a green compact. In this embodiment, the second mixture is subjected to extruding.

In step (e), the green compact is sintered to obtain a ceramic electrolyte.

In step (f), the ceramic electrolyte is assembled with an anode and a cathode to obtain the solid state fuel cell.

The embodiments of the disclosure will now be explained in more detail below by way of the following examples and comparative examples.

Example 1 (EX 1) $La_{9.5}Na_{0.5}Si_6O_{26.5}$ $La_2O_3$ powder was precalcined at 1100° C. for 2 hours for dehydration. The precalcined $La_2O_3$ powder, $SiO_2$ powder, and $Na_2CO_3$ powder (mole ratio: 4.75:6:0.25) were mixed with appropriate amounts of ethanol to obtain a ceramic slurry. The ceramic slurry was milled using Zirconium dioxide ($ZrO_2$) balls for 24 hours, and dried completely to obtain a first ceramic powder. The first ceramic powder was calcined at 900-1300° C. for 2 hours to obtain a silicate oxyapatite.

The silicate oxyapatite was ground and mixed with appropriate amounts of ethanol, milled using Zirconium dioxide ($ZrO_2$) balls for 24 hours, and dried completely to obtain a second ceramic powder. The second ceramic powder (1.5 g, 100 wt %) and PVA powder (5 wt %) were mixed and sieved through a 80 mesh screen, and then extruded using a single-screw extruder (150 MPa) for 30 seconds to obtain a green compact of 30 mm×4 mm×2 mm.

Next, the green compact was placed in a crucible and heated at 5° C./min to 550° C. and maintained at 550° C. 4 hours for removal of PVA and impurity. Thereafter, the green compact without PVA and impurity was subjected to sintering at 1550° C. for 4 hours, to obtain a dense material.

Example 2 (EX 2) $La_{9.3}Na_{0.7}Si_6O_{26.3}$

A dense material of Example 2 was prepared according to a procedure similar to that described in Example 1 except that in Example 2, the mole ratio of the precalcined $La_2O_3$ powder, the $SiO_2$ powder, and the $Na_2CO_3$ powder was 4.65:6:0.35, and the green compact without PVA and impurity was sintered at 1575° C.

Example 3 (EX 3) $La_9NaSi_6O_{26}$

A dense material of Example 3 was prepared according to a procedure similar to that described in Example 1 except that in Example 3, the mole ratio of the precalcined $La_2O_3$ powder, the $SiO_2$ powder, and the $Na_2CO_3$ powder was 4.5:6:0.5.

Example 4 (EX 4) $La_{9.8}K_{0.2}Si_6O_{26.8}$

A dense material of Example 4 was prepared according to a procedure similar to that described in Example 1 except that in Example 4, the $Na_2CO_3$ powder was replaced by $K_2CO_3$ powder, the mole ratio of the precalcined $La_2O_3$ powder, the $SiO_2$ powder, and the $K_2CO_3$ powder was 4.9:6:0.1, and the green compact without PVA and impurity was sintered at 1575° C.

Example 5 (EX 5) $La_{9.5}K_{0.5}Si_6O_{26.5}$

A dense material of Example 5 was prepared according to a procedure similar to that described in Example 1 except that in Example 5, the $Na_2CO_3$ powder was replaced by $K_2CO_3$ powder, and the green compact without PVA and impurity was sintered at 1575° C.

Example 6 (EX 6) $La_{9.3}K_{0.7}Si_6O_{26.3}$

A dense material of Example 6 was prepared according to a procedure similar to that described in Example 2 except that in Example 6, the $Na_2CO_3$ powder was replaced by $K_2CO_3$ powder, and the green compact without PVA and impurity was sintered at 1625° C.

Example 7 (EX 7) $La_9KSi_6O_{26}$

A dense material of Example 7 was prepared according to a procedure similar to that described in Example 3 except that in Example 7, the $Na_2CO_3$ powder was replaced by $K_2CO_3$ powder, and the green compact without PVA and impurity was sintered at 1475° C.

Comparative Example 1 (CE 1) $La_{10}Si_6O_{27}$

A dense material of Comparative Example 1 was prepared according to a procedure similar to that described in Example 1 except that in Comparative Example 1, the $Na_2CO_3$ powder was not used, and the mole ratio of the precalcined $La_2O_3$ powder to the $SiO_2$ powder was 5:6.

Comparative Example 2 (CE2) $La_{9.33}Si_6O_{26}$

A sample ($La_{9.33}(SiO_4)_6O_2$) shown in Table 2 of a Tao's literature (Shanwen Tao et al., "Preparation and characterisation of apatite-type lanthanum silicates by a sol-gel process," Materials Research Bulletin 36 (2001) 1245-1258) was used for comparison. The sintering condition of the sample was 1400° C. for 20 hours.

Phase Structure

Phase Structure of the dense materials in EX 2, EX3, EX 5~EX 7, and CE 1 were determined by X-ray diffraction.

It can be observed that each of the dense materials of EX 2, EX3, and EX 5~EX 7 had a single phase with a slight amount of an undesirable secondary phase, and that the dense material of CE 1 had a higher amount of the undesirable secondary phase. Therefore, it can be concluded that the dense materials of the examples are more suitable for serving as a ceramic electrolyte of a solid state fuel cell.

Electrical Conductivity

Each of the dense materials of EX 1 to EX 7 and CE 1 was subjected to an electrical conductivity test. In each test, four silver wires were attached to four points on the dense material using a silver paste, and the distances among the four points were 5 mm, 10 mm, and 5 mm, respectively. The test sample was kept at 500° C. for 1 hour, 600° C. for 1 hour, 700° C. for 1 hour, and 800° C. for 1 hour. The electrical conductivity of the test sample under each temperature was measured using a 4-wire sensing method, in which a constant voltage was applied to the test sample through two of the silver wires, and a current was measured through the other two of the silver wires, to thereby calculate the electrical conductivity. The result was listed in Table 1.

TABLE 1

|  | Electrical conductivity ($10^{-4}$ S/cm) | | | |
| --- | --- | --- | --- | --- |
|  | 500° C. | 600° C. | 700° C. | 800° C. |
| EX 1 ($La_{9.5}Na_{0.5}Si_6O_{26.5}$) | 2.79 | 14.1 | 41.7 | 89.1 |
| EX 2 ($La_{9.3}Na_{0.7}Si_6O_{26.3}$) | 5.62 | 58.1 | 58.2 | 122 |
| EX 3 ($La_9NaSi_6O_{26}$) | 0.00551 | 0.0365 | 0.144 | 0.373 |

TABLE 1-continued

| | Electrical conductivity ($10^{-4}$ S/cm) | | | |
|---|---|---|---|---|
| | 500° C. | 600° C. | 700° C. | 800° C. |
| EX 4 ($La_{9.8}K_{0.2}Si_6O_{26.8}$) | 2.42 | 9.23 | 24.4 | 52.7 |
| EX 5 ($La_{9.5}K_{0.5}Si_6O_{26.5}$) | 9.52 | 37.3 | 98.4 | 208 |
| EX 6 ($La_{9.3}K_{0.7}Si_6O_{26.3}$) | 6.80 | 24.1 | 61.2 | 128 |
| EX 7 ($La_9KSi_6O_{26}$) | 0.0244 | 0.0842 | 0.257 | 55.3 |
| CE 1 ($La_{10}Si_6O_{27}$) | 1.91 | 7.14 | 19.4 | 42.2 |

It can be seen from the results shown in Table 1 that under a relatively lower temperature ranging from 500° C. to 700° C., the dense materials of EX 1, EX 2, and EX 4 to EX 6 have better electrical conductivities than that of CE 1, and that under 800° C., the dense materials of EX 1, EX 2, and EX 4 to EX 7 have better electrical conductivities than that of CE 1. In addition, the sample of CE 2 listed in Tao's paper had an electrical conductivity of $7.31 \times 10^{-5}$ S/cm at 500° C., which is worse than those of the dense materials of EX 1, EX 2, and EX 4 to EX 6. Therefore, the dense materials made in the examples can be used as a material of a ceramic electrolyte of a solid state fuel cell.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A solid state fuel cell comprising an anode, a cathode, and a ceramic electrolyte including a silicate oxyapatite represented by $$RE_{y-x}M_xSi_6O_{27\pm\delta}$$

where RE is a rare earth metal, M is an alkali metal, x is greater than 0 and less than 1, y ranges from 9.3 to 10, and δ ranges from 0 to 2.

2. The solid state fuel cell according to claim 1, wherein M is sodium or potassium and y is 10.

3. The solid state fuel cell according to claim 1, wherein M is sodium and x is not less than 0.5.

4. The solid state fuel cell according to claim 1, wherein M is potassium and x is not less than 0.2.

5. The solid state fuel cell according to claim 1, wherein RE is lanthanum.

* * * * *